US012581384B2

(12) United States Patent
Malik et al.

(10) Patent No.: US 12,581,384 B2
(45) Date of Patent: Mar. 17, 2026

(54) SYSTEMS AND METHODS FOR NETWORK SLICE PERFORMANCE OPTIMIZATION

(71) Applicant: Verizon Patent and Licensing Inc., Basking Ridge, NJ (US)

(72) Inventors: Ali Imdad Malik, East Brunswick, NJ (US); Amir Saghir, Frisco, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 336 days.

(21) Appl. No.: 18/349,564

(22) Filed: Jul. 10, 2023

(65) Prior Publication Data

US 2025/0024341 A1     Jan. 16, 2025

(51) Int. Cl.
| | |
|---|---|
| *H04W 36/26* | (2009.01) |
| *H04L 41/5009* | (2022.01) |
| *H04W 36/12* | (2009.01) |
| *H04W 36/14* | (2009.01) |

(52) U.S. Cl.
CPC ......... *H04W 36/26* (2013.01); *H04L 41/5009* (2013.01); *H04W 36/12* (2013.01); *H04W 36/142* (2023.05)

(58) Field of Classification Search
CPC ... H04W 36/12; H04W 36/26; H04W 36/142; H04L 41/5009
See application file for complete search history.

(56) References Cited

U.S. PATENT DOCUMENTS

| | | | | |
|---|---|---|---|---|
| 2019/0364495 A1* | 11/2019 | Mildh | ............... | H04W 74/0833 |
| 2020/0374181 A1* | 11/2020 | Stenberg | ............... | H04W 48/18 |
| 2021/0051444 A1* | 2/2021 | Ryu | ......................... | G01S 19/47 |
| 2021/0297910 A1* | 9/2021 | Maguire | ............... | H04W 48/20 |
| 2021/0368514 A1* | 11/2021 | Xing | .................... | H04L 41/0896 |
| 2023/0156583 A1* | 5/2023 | Murray | ................. | H04W 48/20 370/329 |
| 2023/0328596 A1* | 10/2023 | Qiao | ................. | H04W 36/0011 370/330 |
| 2023/0388859 A1* | 11/2023 | Bulakci | .................. | H04W 24/00 |
| 2024/0107435 A1* | 3/2024 | Godin | .................... | H04W 48/16 |
| 2024/0163757 A1* | 5/2024 | Zhao | ..................... | H04W 36/08 |
| 2025/0039819 A1* | 1/2025 | Ishii | ...................... | H04W 48/16 |
| 2025/0071669 A1* | 2/2025 | Ishii | ....................... | H04W 48/20 |
| 2025/0227648 A1* | 7/2025 | Chun | .................... | H04W 60/04 |
| 2025/0234235 A1* | 7/2025 | Mariyani | ............... | H04W 8/04 |

* cited by examiner

*Primary Examiner* — Melanie Jagannathan

(57) ABSTRACT
A network device may receive an indication that a radio access network fails to support a network slice target service level agreement for a user equipment associated with a network slice. The network device may provide, to the radio access network, a network slice identifier associated with the network slice target service level agreement not supported by the radio access network. The network device may provide, to the radio access network, an indication of whether a neighbor radio access network supports the network slice target service level agreement to cause the radio access network to redirect the user equipment to a neighbor radio access network or to move the user equipment to another network slice.

20 Claims, 8 Drawing Sheets

100 ➡

100 ➡

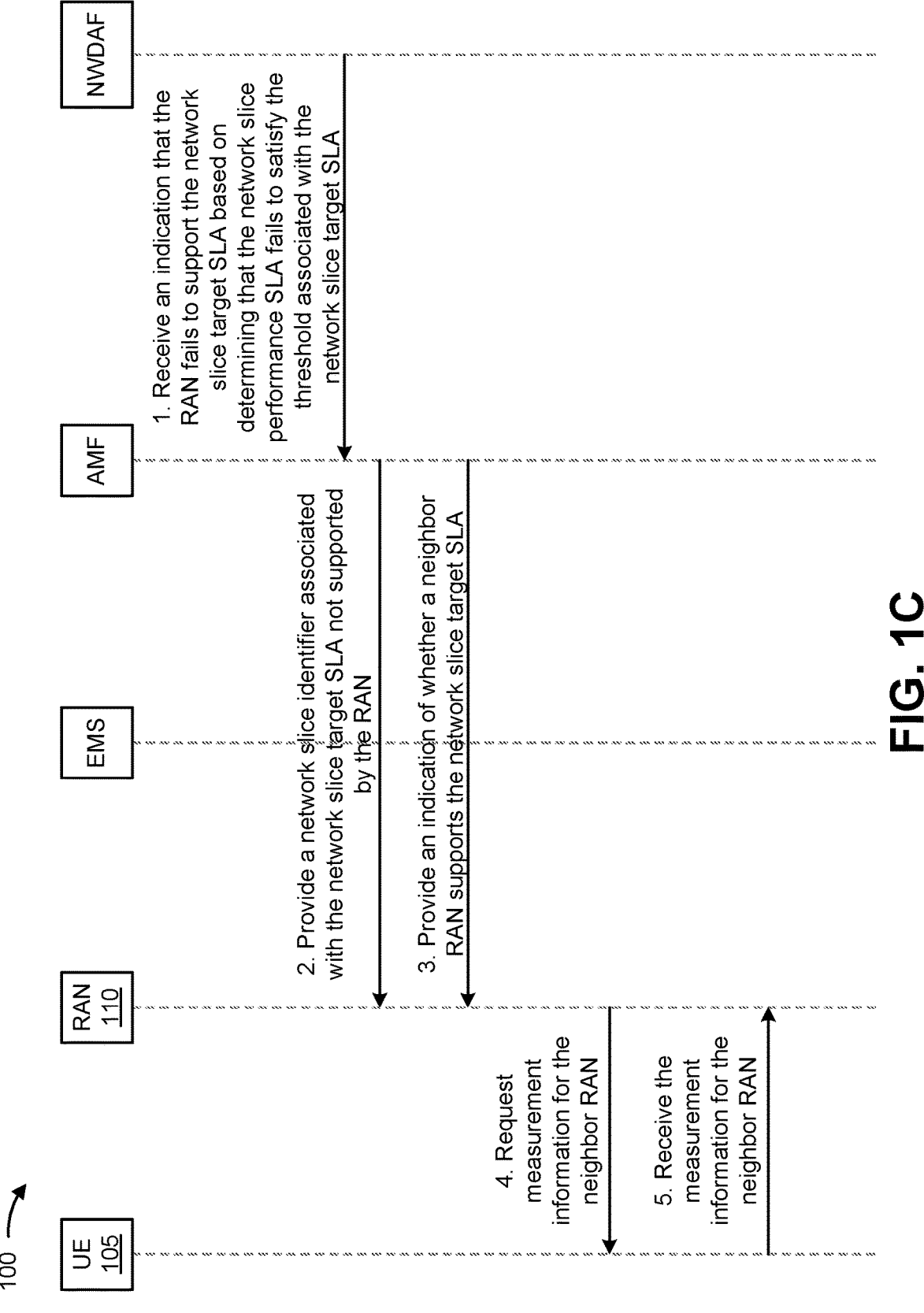

100

NWDAF

AMF

EMS

RAN
110

UE
105

1. Receive an indication that the RAN fails to support the network slice target SLA based on determining that the network slice performance SLA fails to satisfy the threshold associated with the network slice target SLA 2. Provide a network slice identifier associated with the network slice target SLA not supported by the RAN 3. Provide an indication of whether a neighbor RAN supports the network slice target SLA 4. Request measurement information for the neighbor RAN 5. Receive the measurement information for the neighbor RAN

FIG. 1C

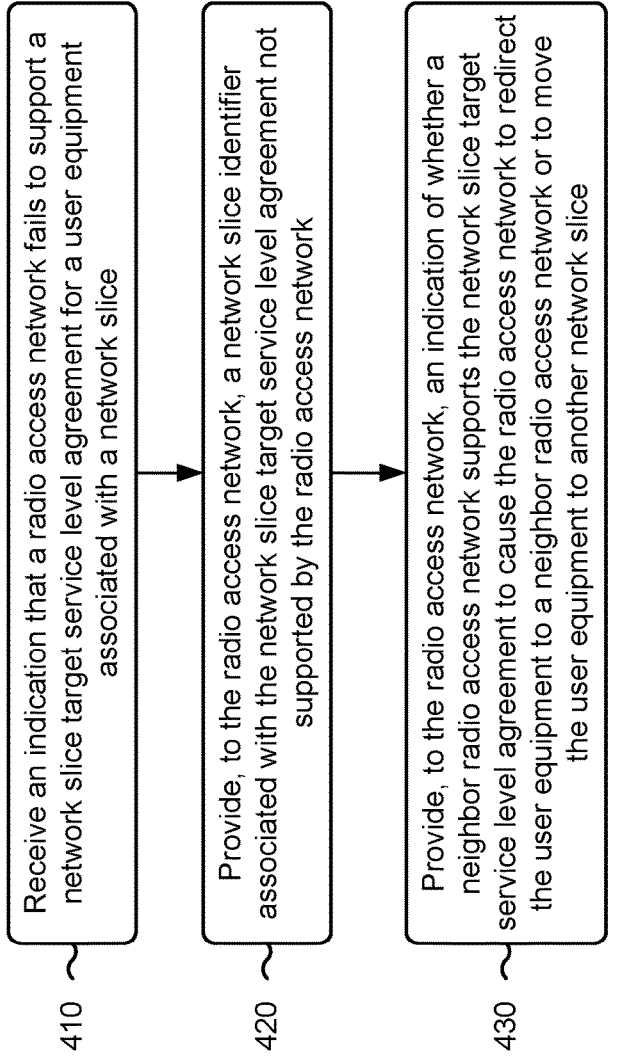

410 — Receive an indication that a radio access network fails to support a network slice target service level agreement for a user equipment associated with a network slice 420 — Provide, to the radio access network, a network slice identifier associated with the network slice target service level agreement not supported by the radio access network 430 — Provide, to the radio access network, an indication of whether a neighbor radio access network supports the network slice target service level agreement to cause the radio access network to redirect the user equipment to a neighbor radio access network or to move the user equipment to another network slice

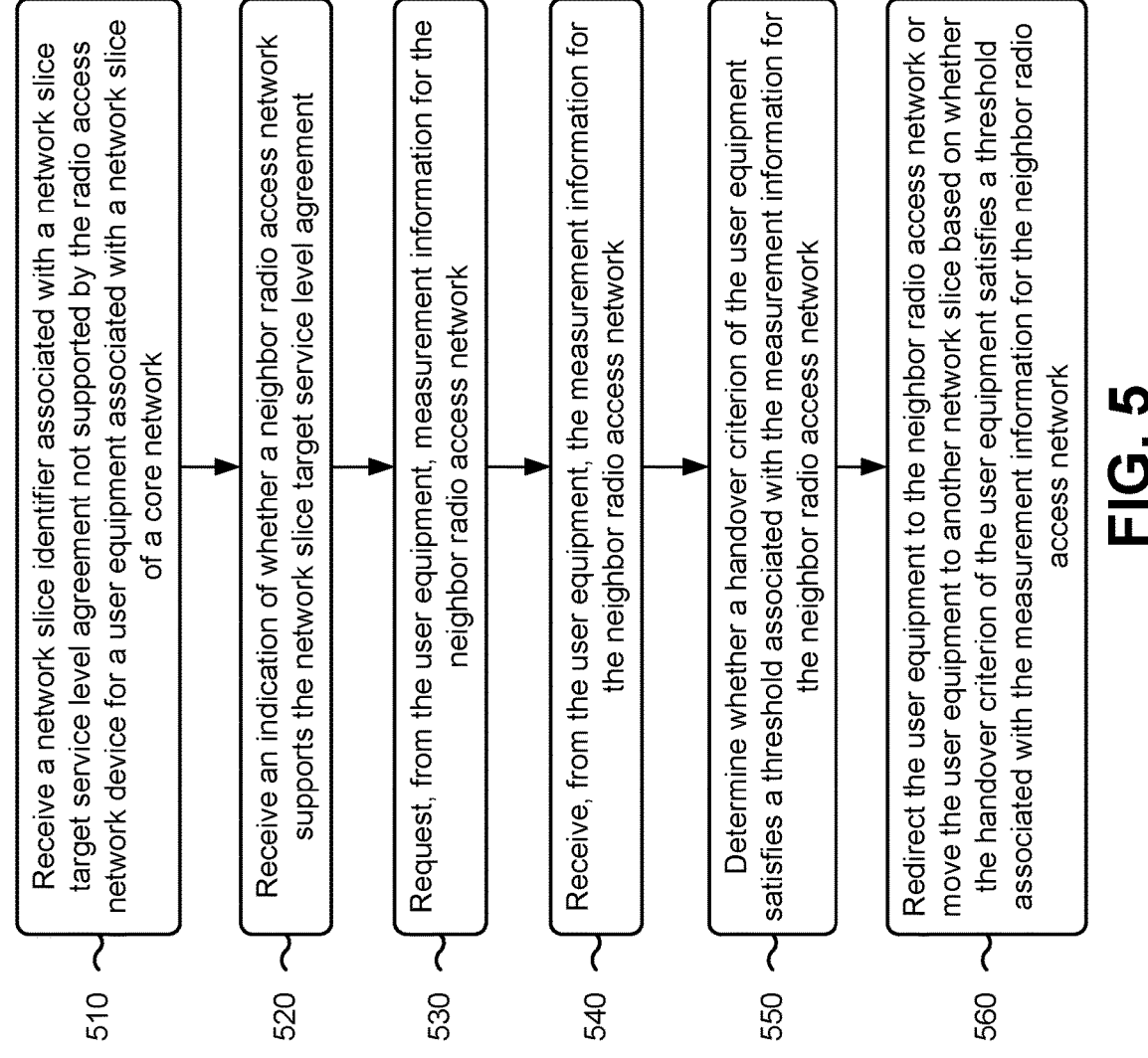

500

510 — Receive a network slice identifier associated with a network slice target service level agreement not supported by the radio access network device for a user equipment associated with a network slice of a core network 520 — Receive an indication of whether a neighbor radio access network supports the network slice target service level agreement 530 — Request, from the user equipment, measurement information for the neighbor radio access network 540 — Receive, from the user equipment, the measurement information for the neighbor radio access network 550 — Determine whether a handover criterion of the user equipment satisfies a threshold associated with the measurement information for the neighbor radio access network 560 — Redirect the user equipment to the neighbor radio access network or move the user equipment to another network slice based on whether the handover criterion of the user equipment satisfies a threshold associated with the measurement information for the neighbor radio access network

FIG. 5

SYSTEMS AND METHODS FOR NETWORK SLICE PERFORMANCE OPTIMIZATION

BACKGROUND

Radio access networks (RANs) that provide small cells (e.g., femtocells) or large cells are associated with backhauls provided by Internet service provider (ISP) networks.

BRIEF DESCRIPTION OF THE DRAWINGS

FIGS. 1A-1D are diagrams of an example associated with network slice performance optimization.

FIGS. 4 and 5 are flowcharts of example processes for network slice performance optimization.

DETAILED DESCRIPTION OF EXAMPLE EMBODIMENTS

Figure 1A:
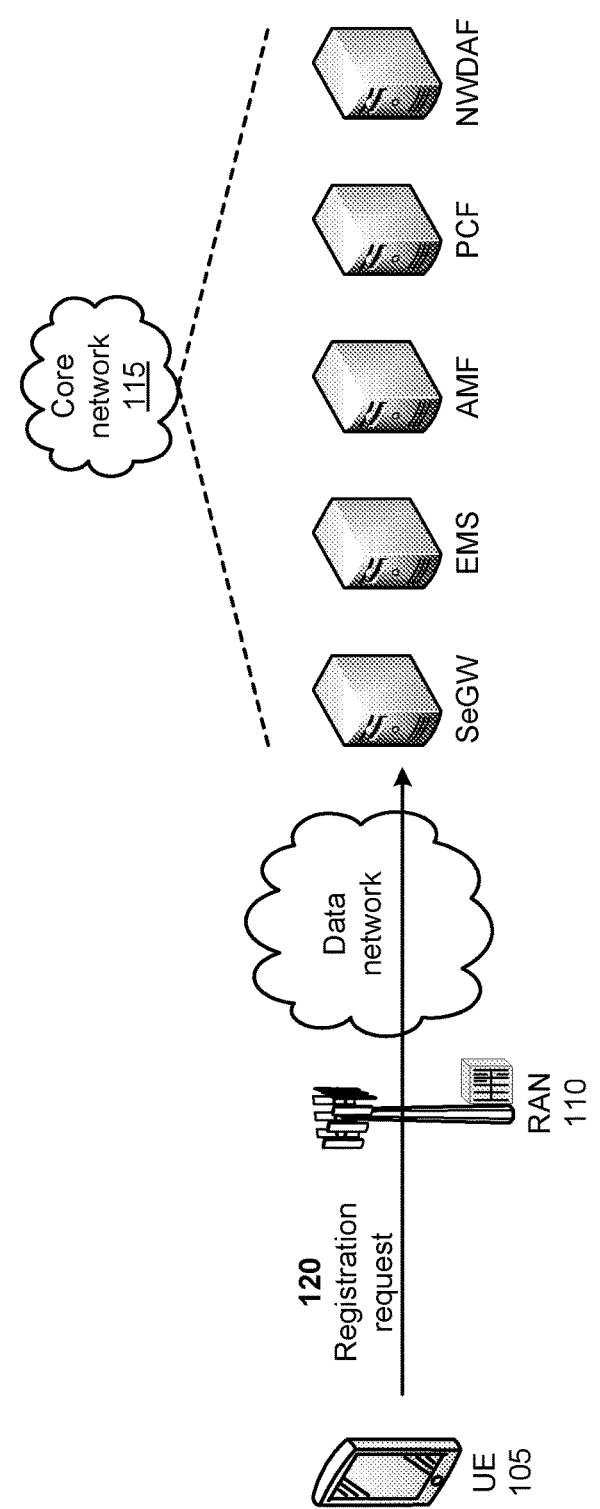

The following detailed description of example implementations refers to the accompanying drawings. The same reference numbers in different drawings may identify the same or similar elements.

The backhauls provided by ISP networks to RANs may include large variations in packet delays, throughput, jitter, packet errors, and/or the like. A fifth generation (5G) core network may support multiple network slices and each network slice may include configured performance expectations in terms of latency, quality of service (QoS), throughput, packet error rate, and/or the like. A 5G core network may include multiple nodes for user plane traffic and data plane traffic and may get congested at different times of a day or days of a week. Such network congestion impacts network slice performance and results in a bad user experience for a user of the network slice. Thus, current network configurations consume computing resources (e.g., processing resources, memory resources, communication resources, and/or the like), networking resources, and/or other resources associated with providing poor network slice performance for users, failing to optimize network slice performance, handling lost traffic due to poor network slice performance, and/or the like.

Some implementations described herein relate to a network device that provides network slice performance optimization. For example, a network device (e.g., an access and mobility management function (AMF)) may receive an indication that a RAN fails to support a network slice target service level agreement (SLA) for a user equipment (UE) associated with a network slice. The AMF may provide, to the RAN, a network slice identifier associated with the network slice target SLA not supported by the RAN. The AMF may provide, to the RAN, an indication of whether a neighbor RAN supports the network slice target SLA, to cause the RAN to redirect the UE to a neighbor RAN or to move the UE to another network slice.

In this way, the network device provides network slice performance optimization. For example, a RAN may report a network slice performance SLA to an element management system (EMS), and the EMS may provide the network slice performance SLA to a network data analytics function (NWDAF). The NWDAF may receive network slice policy information from a policy control function (PCF), and may perform analytics based on the network slice performance SLA and the network slice policy information to identify an issue with the network slice supporting a UE. The NWDAF may inform an AMF of the issue with the network slice supporting the UE, and the AMF may provide the issue to the RAN. Based on the issue, the RAN may redirect the UE to a neighboring RAN that satisfies the network slice policy information or may move the UE to another network slice that satisfies the network slice policy information. Thus, the AMF may conserve computing resources, networking resources, and/or other resources that would have otherwise been consumed by providing poor network slice performance for users, failing to optimize network slice performance, handling lost traffic due to poor network slice performance, and/or the like.

FIGS. 1A-1D are diagrams of an example 100 associated with network slice performance optimization. As shown in FIGS. 1A-1D, example 100 includes a UE 105, a RAN 110, a data network, and a core network 115 that includes a security gateway (SeGW), an EMS, an AMF, a PCF, and an NWDAF. Further details of the UE 105, the RAN 110, the data network, the core network 115, the SeGW, the EMS, the AMF, the PCF, and the NWDAF are provided elsewhere herein. Although a single UE 105 and single RAN 110 are depicted in FIGS. 1A-1D, in some implementations, multiple UEs 105 and multiple RANs 110 may be associated with the data network and the core network 115.

As shown in FIG. 1A, and by reference number 120, the UE 105 may provide a registration request (e.g., a protocol data unit (PDU) session establishment request) to the RAN 110, and the RAN 110 may provide the registration request to the core network 115. For example, the UE 105 may attempt to establish a PDU session with the core network 115, via the RAN 110, in order to communicate with other UEs 105, an application server, a cloud computing environment, and/or the like. In order to establish the PDU session, the UE 105 may generate the registration request that requests establishment of the PDU session with the RAN 110 and the core network 115. The registration request may also include credentials of a user of the UE 105, an identifier of the UE 105, and/or the like. The UE 105 may provide the registration request to the RAN 110, and the RAN 110 may forward the registration request to the core network 115. The core network 115 may receive the registration request from the RAN 110.

Figure 1B:
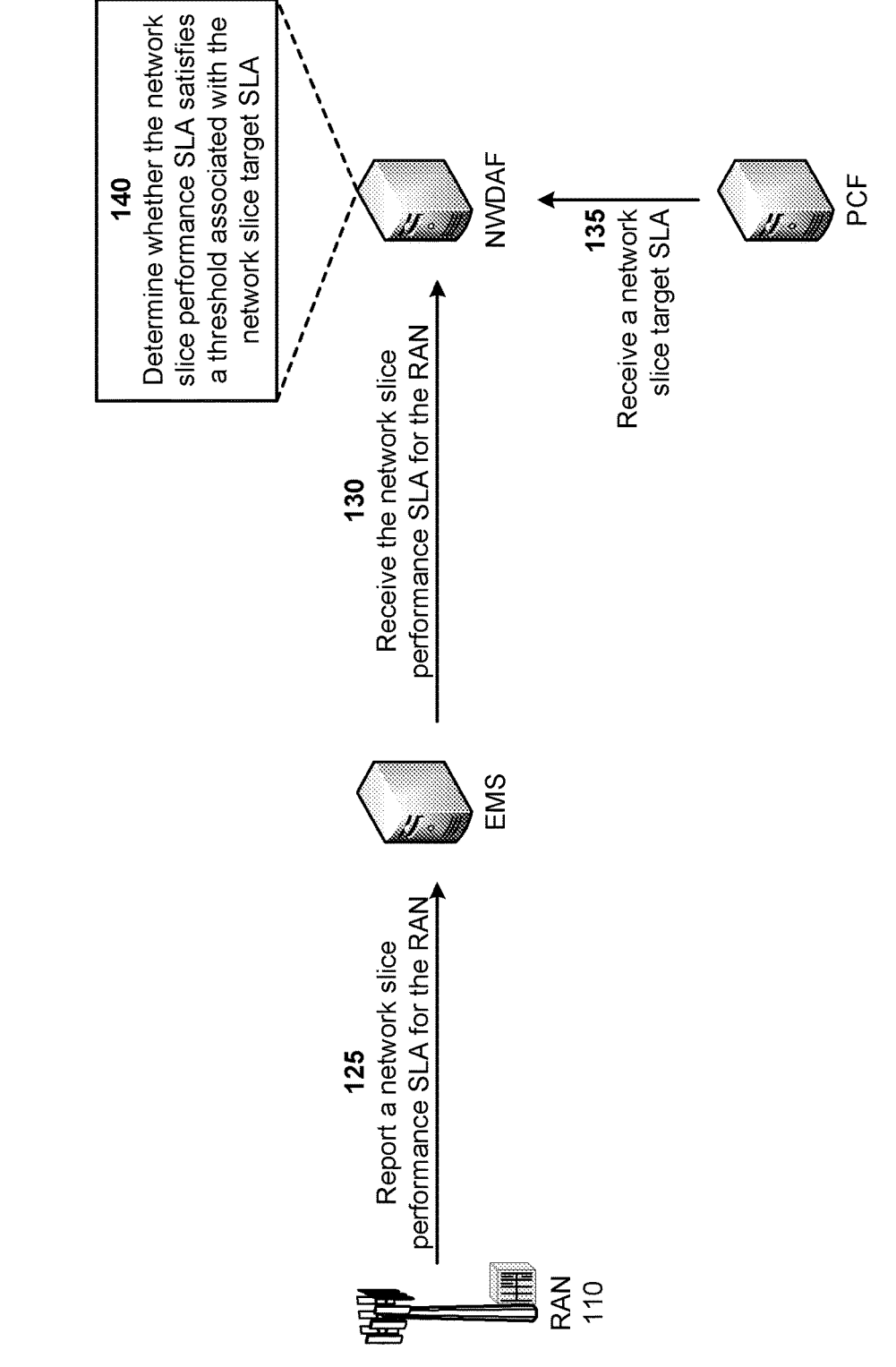

As shown in FIG. 1B, and by reference number 125, the RAN 110 may report, to the EMS, a network slice performance SLA for the RAN 110. For example, the RAN 110 may report key performance indicators (KPIs) associated with backhaul performance (e.g., by the data network) to the EMS (e.g., a management entity for the RAN 110) on a periodic basis. In some implementations, the KPIs may provide an indication of the network slice performance SLA for the RAN 110. In some implementations, the network slice performance SLA may be associated with a network slice utilized by the UE 105 via the RAN 110. The network slice may provide services associated with gaming, enhanced mobile broadband, Internet of Things (IoT), messaging, and/or the like. The RAN 110 may securely report the network slice performance SLA to the EMS via the SeGW.

As further shown in FIG. 1B, and by reference number 130, the NWDAF may receive the network slice performance SLA for the RAN 110 from the EMS. For example, the NWDAF may periodically provide, to the EMS, a request for the network slice performance SLA for the RAN 110 (e.g., the backhaul performance KPIs). The EMS may provide the network slice performance SLA to the NWDAF based on the request received from the NWDAF.

As further shown in FIG. 1B, and by reference number 135, the NWDAF may receive a network slice target SLA. For example, the NWDAF may provide, to the PCF, a request for network slice policy information (e.g., the network slice target SLA) associated with the network slice. The PCF may provide the network slice target SLA to the NWDAF based on the request received from the NWDAF.

As further shown in FIG. 1B, and by reference number 140, the NWDAF may determine whether the network slice performance SLA satisfies a threshold associated with the network slice target SLA. For example, the NWDAF may determine whether the threshold associated with the network slice target SLA may be satisfied for a time of a day and/or a day of a week based on the backhaul performance KPIs (e.g., the network slice performance SLA for the RAN 110). In some implementations, the NWDAF may determine that the network slice performance SLA satisfies the threshold associated with the network slice target SLA. In such implementations, the RAN 110 may receive, from the NWDAF, a network slice identifier associated with the network slice target SLA supported by the RAN 110 for the UE 105, and may maintain connectivity of the UE 105 with the network slice based on receiving the network slice identifier. Alternatively, the NWDAF may determine that the network slice performance SLA fails to satisfy the threshold associated with the network slice target SLA. In such implementations, the functions described below in connection FIGS. 1C and 1D may be performed.

Figure 1D:
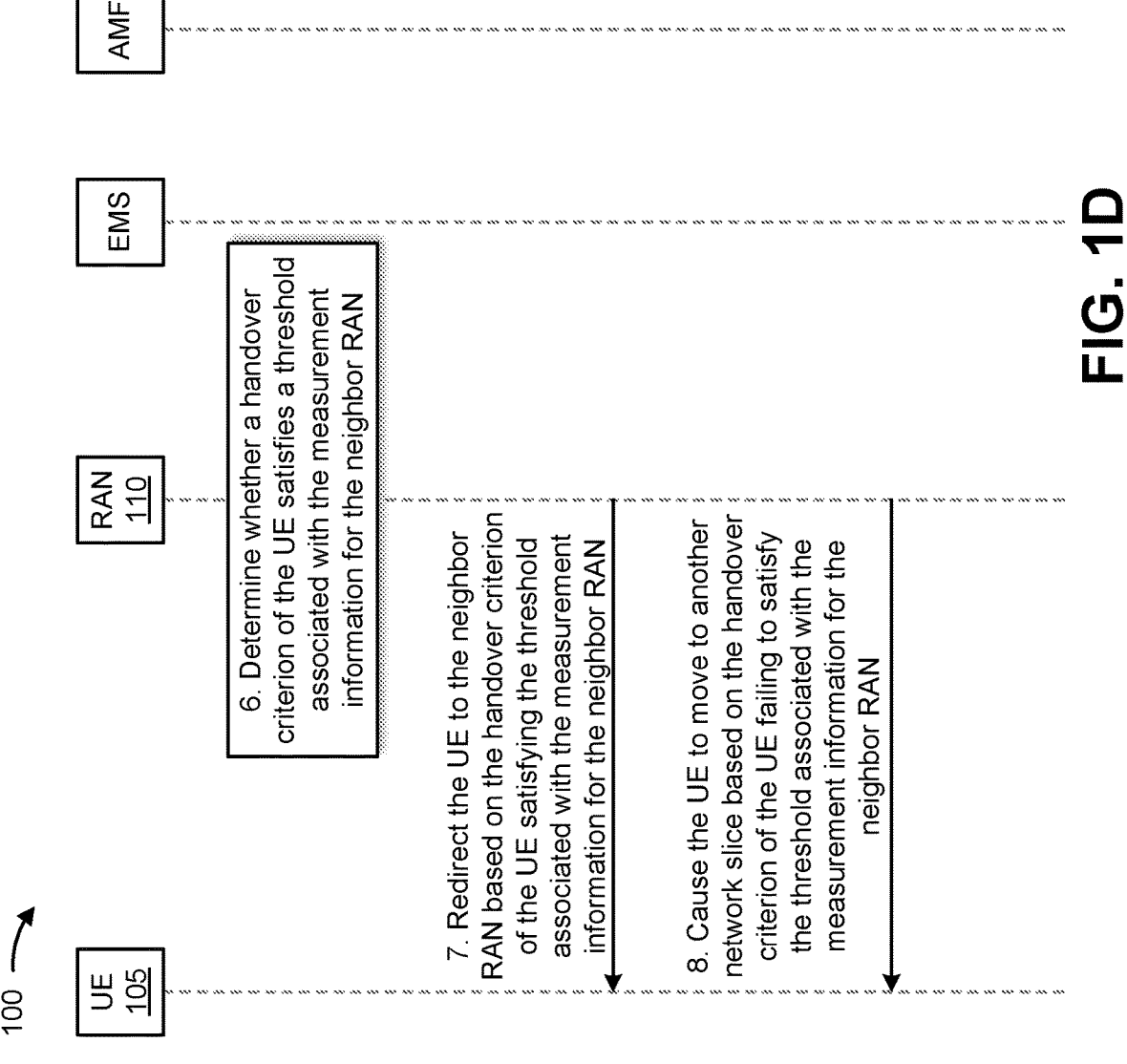

FIGS. 1C and 1D provide a call flow diagram depicting steps associated with providing network slice performance optimization. As shown at step 1 of FIG. 1C, the AMF may receive, from the NWDAF, an indication that the RAN 110 fails to support the network slice target SLA based on the NWDAF determining that the network slice performance SLA fails to satisfy a threshold associated with the network slice target SLA. For example, when the NWDAF determines that the network slice performance SLA fails to satisfy the threshold associated with the network slice target SLA, the NWDAF may generate the indication that the RAN 110 fails to support the network slice target SLA and may provide the indication to the AMF. The AMF may receive the indication that the RAN 110 fails to support the network slice target SLA from the NWDAF.

As shown at step 2 of FIG. 1C, the AMF may provide a network slice identifier associated with the network slice target SLA not supported by the RAN 110. For example, when the AMF receives the indication that the RAN 110 fails to support the network slice target SLA (e.g., for the network slice), the AMF may determine the network slice identifier associated with the network slice and the network slice target SLA. The AMF may provide, to the RAN 110, the network slice identifier associated with the network slice target SLA not supported by the RAN 110, and the RAN 110 may receive the network slice identifier associated with the network slice target SLA not supported by the RAN 110.

As shown at step 3 of FIG. 1C, the AMF may provide an indication of whether a neighbor RAN 110 supports the network slice target SLA. For example, when the AMF receives the indication that the RAN 110 fails to support the network slice target SLA (e.g., for the network slice), the AMF may determine that the neighbor RAN 110 supports the network slice target SLA. The AMF may generate the indication that the neighbor RAN 110 supports the network slice target SLA based on determining that the neighbor RAN 110 supports the network slice target SLA. The AMF may provide the indication that the neighbor RAN 110 supports the network slice target SLA to the RAN 110, and the RAN 110 may receive the indication that the neighbor RAN 110 supports the network slice target SLA.

As shown at step 4 of FIG. 1C, the RAN 110 may request measurement information for the neighbor RAN 110. For example, when the RAN 110 receives the indication that the neighbor RAN 110 supports the network slice target SLA, the RAN 110 may generate a request for the measurement information (e.g., backhaul performance KPIs, a network slice performance SLA, and/or the like). The RAN 110 may provide the request for the measurement information to the UE 105, and the UE 105 may receive the request for the measurement information. As shown at step 5, the RAN 110 may receive the measurement information for the neighbor RAN 110. For example, when the UE 105 receives the request for the measurement information, the UE 105 may determine the measurement information for the neighbor RAN 110 based on the request. The UE 105 may provide the measurement information for the neighbor RAN 110 to the RAN 110, and the RAN 110 may receive the measurement information for the neighbor RAN 110.

As shown at step 6 of FIG. 1D, the RAN 110 may determine whether a handover criterion of the UE 105 satisfies a threshold associated with the measurement information for the neighbor RAN 110. For example, when the RAN 110 receives the measurement information for the neighbor RAN 110 from the UE 105, the RAN 110 may determine whether the handover criterion of the UE 105 satisfies the threshold associated with the measurement information for the neighbor RAN 110. In some implementations, the RAN 110 may determine that the handover criterion of the UE 105 satisfies the threshold associated with the measurement information for the neighbor RAN 110. Alternatively, the RAN 110 may determine that the handover criterion of the UE 105 fails to satisfy the threshold associated with the measurement information for the neighbor RAN 110.

As shown at step 7 of FIG. 1D, the RAN 110 may redirect the UE 105 to the neighbor RAN 110 based on the handover criterion of the UE 105 satisfying the threshold associated with the measurement information for the neighbor RAN 110. For example, when the RAN 110 determines that the handover criterion of the UE 105 satisfies the threshold associated with the measurement information for the neighbor RAN 110, the RAN 110 may redirect the UE 105 to the neighbor RAN 110. The neighbor RAN 110 may provide the network slice to the UE 105 may support the network slice target SLA.

As shown at step 8 of FIG. 1D, the RAN 110 may cause the UE 105 to move to another network slice based on the handover criterion of the UE 105 failing to satisfy the threshold associated with the measurement information for the neighbor RAN 110. For example, when the RAN 110 determines that the handover criterion of the UE 105 fails to satisfy the threshold associated with the measurement information for the neighbor RAN 110, the RAN 110 may cause the UE 105 to move to another network slice supported by the RAN 110. The RAN 110 may provide, to the UE 105, the other network slice that is comparable to the network slice not adequately supported by the RAN 110 for the UE 105. In some implementations, the RAN 110 may perform a radio resource control (RRC) reconfiguration that assigns resources (e.g., 5G QoS identifiers (5QIs)) to the UE 105 in order to provide the other network slice to the UE 105 (e.g., that supports a network slice target SLA).

In this way, the network device provides network slice performance optimization. For example, the RAN 110 may report a network slice performance SLA to the EMS, and the EMS may provide the network slice performance SLA to the NWDAF. The NWDAF may receive network slice policy information from the PCF, and may perform analytics based on the network slice performance SLA and the network slice policy information to identify an issue with the network slice supporting the UE 105. The NWDAF may inform the AMF of the issue with the network slice supporting the UE 105, and the AMF may provide the issue to the RAN 110. Based on the issue, the RAN 110 may redirect the UE 105 to a neighboring RAN 110 that satisfies the network slice policy information or may move the UE 105 to another network slice that satisfies the network slice policy information. Thus, the AMF may conserve computing resources, networking resources, and/or other resources that would have otherwise been consumed by providing poor network slice performance for users, failing to optimize network slice performance, handling lost traffic due to poor network slice performance, and/or the like.

As indicated above, FIGS. 1A-1D are provided as an example. Other examples may differ from what is described with regard to FIGS. 1A-1D. The number and arrangement of devices shown in FIGS. 1A-1D are provided as an example. In practice, there may be additional devices, fewer devices, different devices, or differently arranged devices than those shown in FIGS. 1A-1D. Furthermore, two or more devices shown in FIGS. 1A-1D may be implemented within a single device, or a single device shown in FIGS. 1A-1D may be implemented as multiple, distributed devices. Additionally, or alternatively, a set of devices (e.g., one or more devices) shown in FIGS. 1A-1D may perform one or more functions described as being performed by another set of devices shown in FIGS. 1A-1D.

Figure 2:
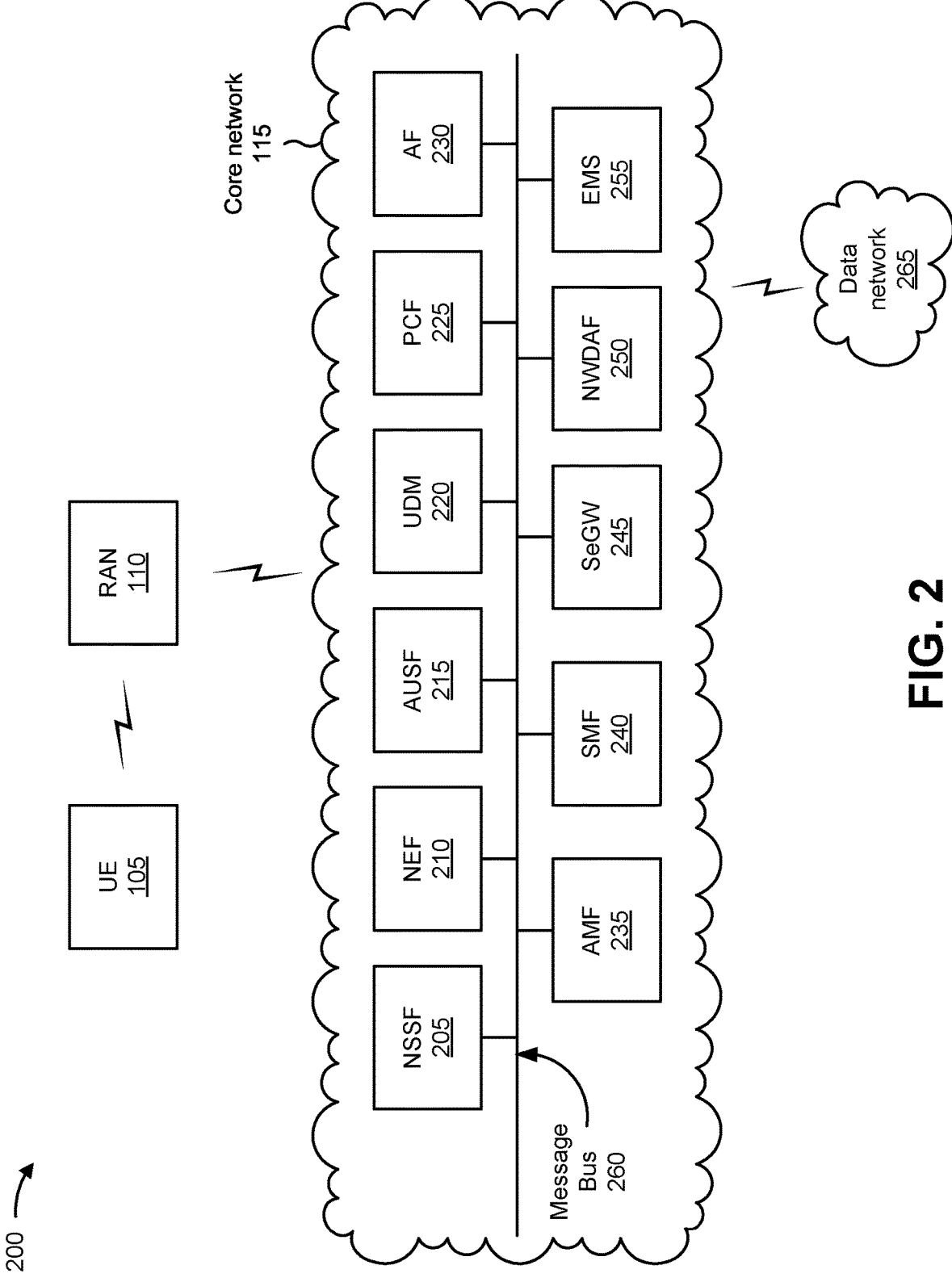
FIG. 2 is a diagram of an example environment in which systems and/or methods described herein may be implemented.

FIG. 2 is a diagram of an example environment 200 in which systems and/or methods described herein may be implemented. As shown in FIG. 2, the example environment 200 may include the UE 105, the RAN 110, the core network 115, and a data network 265. Devices and/or networks of the example environment 200 may interconnect via wired connections, wireless connections, or a combination of wired and wireless connections.

The UE 105 includes one or more devices capable of receiving, generating, storing, processing, and/or providing information, such as information described herein. For example, the UE 105 can include a mobile phone (e.g., a smart phone or a radiotelephone), a laptop computer, a tablet computer, a desktop computer, a handheld computer, a gaming device, a wearable communication device (e.g., a smart watch or a pair of smart glasses), a mobile hotspot device, a fixed wireless access device, customer premises equipment, an autonomous vehicle, or a similar type of device.

The RAN 110 may support, for example, a cellular radio access technology (RAT). The RAN 110 may include one or more base stations (e.g., base transceiver stations, radio base stations, node Bs, eNodeBs (eNBs), gNodeBs (gNBs), base station subsystems, cellular sites, cellular towers, access points, transmit receive points (TRPs), radio access nodes, macrocell base stations, microcell base stations, picocell base stations, femtocell base stations, or similar types of devices) and other network entities that can support wireless communication for the UE 105. The RAN 110 may transfer traffic between the UE 105 (e.g., using a cellular RAT), one or more base stations (e.g., using a wireless interface or a backhaul interface, such as a wired backhaul interface), and/or the core network 115. The RAN 110 may provide one or more cells that cover geographic areas.

In some implementations, the RAN 110 may perform scheduling and/or resource management for the UE 105 covered by the RAN 110 (e.g., the UE 105 covered by a cell provided by the RAN 110). In some implementations, the RAN 110 may be controlled or coordinated by a network controller, which may perform load balancing, network-level configuration, and/or other operations. The network controller may communicate with the RAN 110 via a wireless or wireline backhaul. In some implementations, the RAN 110 may include a network controller, a self-organizing network (SON) module or component, or a similar module or component. In other words, the RAN 110 may perform network control, scheduling, and/or network management functions (e.g., for uplink, downlink, and/or sidelink communications of the UE 105 covered by the RAN 110).

In some implementations, the core network 115 may include an example functional architecture in which systems and/or methods described herein may be implemented. For example, the core network 115 may include an example architecture of a 5G next generation (NG) core network included in a 5G wireless telecommunications system. While the example architecture of the core network 115 shown in FIG. 2 may be an example of a service-based architecture, in some implementations, the core network 115 may be implemented as a reference-point architecture and/or a 4G core network, among other examples.

As shown in FIG. 2, the core network 115 may include a number of functional elements. The functional elements may include, for example, a network slice selection function (NSSF) 205, a network exposure function (NEF) 210, an authentication server function (AUSF) 215, a unified data management (UDM) component 220, a PCF 225, an application function (AF) 230, an AMF 235, a session management function (SMF) 240, an SeGW 245, an NWDAF 250, and/or an EMS 255. These functional elements may be communicatively connected via a message bus 260. Each of the functional elements shown in FIG. 2 is implemented on one or more devices associated with a wireless telecommunications system. In some implementations, one or more of the functional elements may be implemented on physical devices, such as an access point, a base station, and/or a gateway. In some implementations, one or more of the functional elements may be implemented on a computing device of a cloud computing environment.

The NSSF 205 includes one or more devices that select network slice instances for the UE 105. By providing network slicing, the NSSF 205 allows an operator to deploy multiple substantially independent end-to-end networks potentially with the same infrastructure. In some implementations, each slice may be customized for different services.

The NEF 210 includes one or more devices that support exposure of capabilities and/or events in the wireless telecommunications system to help other entities in the wireless telecommunications system discover network services.

The AUSF 215 includes one or more devices that act as an authentication server and support the process of authenticating the UE 105 in the wireless telecommunications system.

The UDM component 220 includes one or more devices that store user data and profiles in the wireless telecommunications system. The UDM component 220 may be used for fixed access and/or mobile access in the core network 115.

The PCF 225 includes one or more devices that provide a policy framework that incorporates network slicing, roaming, packet processing, and/or mobility management, among other examples.

The AF 230 includes one or more devices that support application influence on traffic routing, access to the NEF 210, and/or policy control, among other examples.

The AMF 235 includes one or more devices that act as a termination point for non-access stratum (NAS) signaling and/or mobility management, among other examples.

The SMF 240 includes one or more devices that support the establishment, modification, and release of communication sessions in the wireless telecommunications system. For example, the SMF 240 may configure traffic steering policies and/or may enforce user equipment Internet protocol (IP) address allocation and policies, among other examples.

The SeGW 245 includes one or more devices that act as a boundary network element for the core network 115. The SeGW 245 may connect the RAN 110 to the core network 115 through a virtual secure tunnel provided by a return link after successful bidirectional authentication between the RAN 110 and the SeGW 245. The SeGW 245 may carry user plane data and control plane data transmitted between the RAN 110 and the core network 115.

The NWDAF 250 includes one or more devices that collect data from UEs, network functions, operations, administration, and maintenance (OAM) systems, and/or the like from the core network 115, a cloud computing environment, edge networks, and/or the like, and that utilize the data for analytics.

The EMS 255 includes one or more devices that manage specific types of one or more network elements within a telecommunication management network. The EMS 255 may manage functions and capabilities of a network element, but not necessarily traffic. The EMS 255 may communicate to higher-level systems of network management in order to manage traffic between the EMS 255 and other network elements.

The message bus 260 represents a communication structure for communication among the functional elements. In other words, the message bus 260 may permit communication between two or more functional elements.

The data network 265 includes one or more wired and/or wireless data networks. For example, the data network 265 may include an IP Multimedia Subsystem (IMS), a public land mobile network (PLMN), a local area network (LAN), a wide area network (WAN), a metropolitan area network (MAN), a private network such as a corporate intranet, an ad hoc network, the Internet, a fiber optic-based network, a cloud computing network, a third-party services network, an operator services network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the example environment 200 may perform one or more functions described as being performed by another set of devices of the example environment 200.

Figure 3:
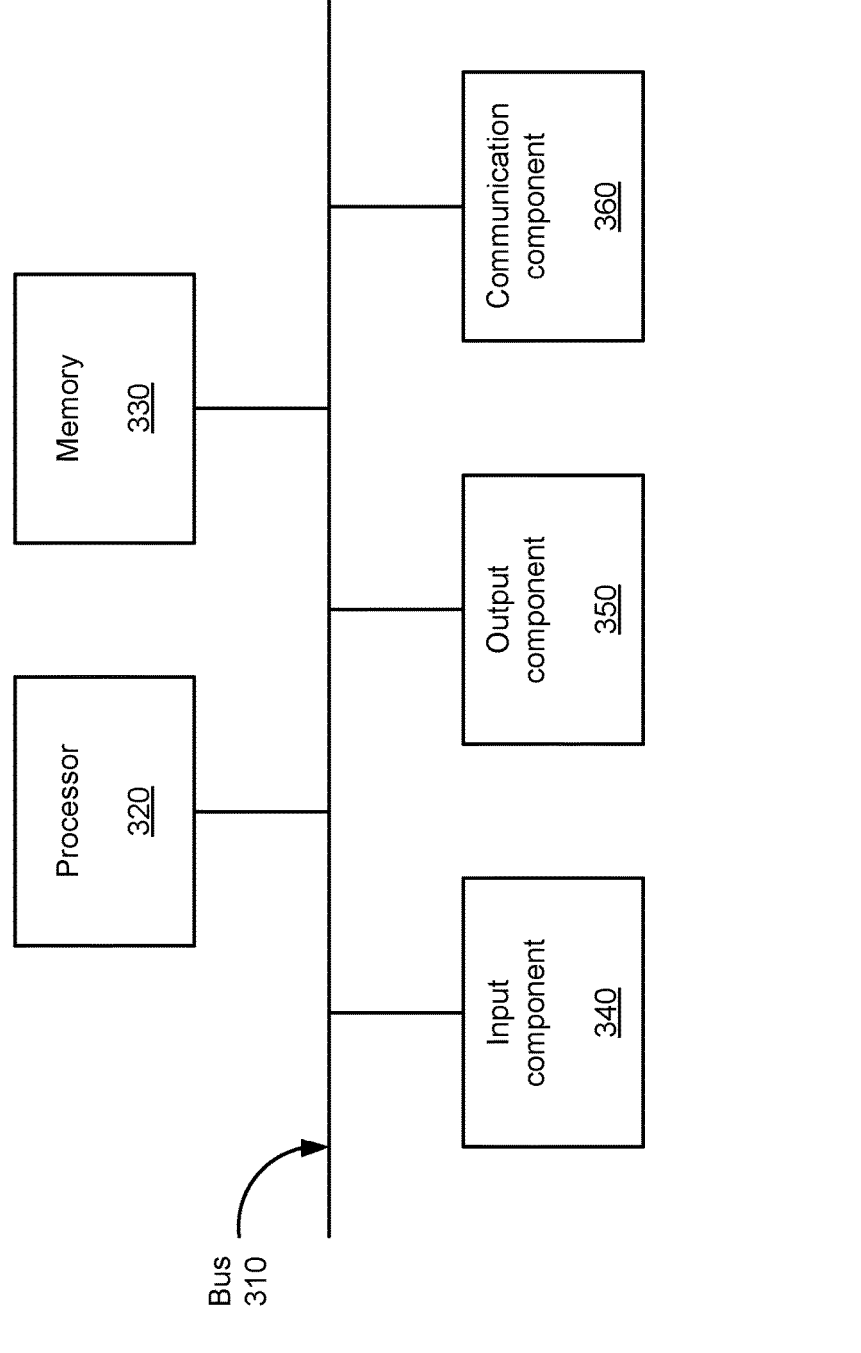
FIG. 3 is a diagram of example components of one or more devices of FIG. 2.

FIG. 3 is a diagram of example components of a device 300, which may correspond to the UE 105, the RAN 110, the NSSF 205, the NEF 210, the AUSF 215, the UDM component 220, the PCF 225, the AF 230, the AMF 235, the SMF 240, the SeGW 245, the NWDAF 250, and/or the EMS 255. In some implementations, the UE 105, the RAN 110, the NSSF 205, the NEF 210, the AUSF 215, the UDM component 220, the PCF 225, the AF 230, the AMF 235, the SMF 240, the SeGW 245, the NWDAF 250, and/or the EMS 255 may include one or more devices 300 and/or one or more components of the device 300. As shown in FIG. 3, the device 300 may include a bus 310, a processor 320, a memory 330, an input component 340, an output component 350, and a communication component 360.

The bus 310 includes one or more components that enable wired and/or wireless communication among the components of the device 300. The bus 310 may couple together two or more components of FIG. 3, such as via operative coupling, communicative coupling, electronic coupling, and/or electric coupling. The processor 320 includes a central processing unit, a graphics processing unit, a microprocessor, a controller, a microcontroller, a digital signal processor, a field-programmable gate array, an application-specific integrated circuit, and/or another type of processing component. The processor 320 is implemented in hardware, firmware, or a combination of hardware and software. In some implementations, the processor 320 includes one or more processors capable of being programmed to perform one or more operations or processes described elsewhere herein.

The memory 330 includes volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. Memory 330 stores information, instructions, and/ or software (e.g., one or more software applications) related to the operation of the device 300. In some implementations, the memory 330 includes one or more memories that are coupled to one or more processors (e.g., the processor 320), such as via the bus 310.

The input component 340 enables the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 enables the device 300 to provide output, such as via a display, a speaker, and/or a light-emitting diode. The communication component 360 enables the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., the memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

FIG. 4 is a flowchart of an example process 400 for network slice performance optimization. In some implementations, one or more process blocks of FIG. 4 may be performed by a network device (e.g., the AMF 235). In some implementations, one or more process blocks of FIG. 4 may be performed by another device or a group of devices separate from or including the network device, such as a RAN (e.g., the RAN 110), a PCF (e.g., the PCF 225), and/or an NWDAF (e.g., the NWDAF 250). Additionally, or alternatively, one or more process blocks of FIG. 4 may be performed by one or more components of the device 300, such as the processor 320, the memory 330, the input component 340, the output component 350, and/or the communication component 360.

As shown in FIG. 4, process 400 may include receiving an indication that a radio access network fails to support a network slice target service level agreement for a user equipment associated with a network slice (block 410). For example, the network device may receive an indication that a radio access network fails to support a network slice target service level agreement for a user equipment associated with a network slice, as described above. In some implementations, receiving the indication that the radio access network fails to support the network slice target service level agreement includes receiving, from a network data analytics function of the core network, the indication that the radio access network fails to support the network slice target service level agreement based on the network data analytics function determining that a network slice performance service level agreement of the radio access network fails to satisfy a threshold associated with the network slice target service level agreement. In some implementations, the network device is an access and mobility management function of the core network. In some implementations, the radio access network is a femtocell base station that communicates with the core network via a service provider network.

As further shown in FIG. 4, process 400 may include providing, to the radio access network, a network slice identifier associated with the network slice target service level agreement not supported by the radio access network (block 420). For example, the network device may provide, to the radio access network, a network slice identifier associated with the network slice target service level agreement not supported by the radio access network, as described above.

As further shown in FIG. 4, process 400 may include providing, to the radio access network, an indication of whether a neighbor radio access network supports the network slice target service level agreement to cause the radio access network to redirect the user equipment to a neighbor radio access network or to move the user equipment to another network slice (block 430). For example, the network device may provide, to the radio access network, an indication of whether a neighbor radio access network supports the network slice target service level agreement to cause the radio access network to redirect the user equipment to a neighbor radio access network or to move the user equipment to another network slice, as described above. In some implementations, the radio access network is configured to redirect the user equipment to the neighbor radio access network based on a handover criterion of the user equipment satisfying a threshold associated with measurement information for the neighbor radio access network. In some implementations, the radio access network is configured to move the user equipment to another network slice based on a handover criterion of the user equipment failing to satisfy a threshold associated with measurement information for the neighbor radio access network. In some implementations, the indication of whether the neighbor radio access network supports the network slice target service level agreement causes the radio access network to request measurement information for the neighbor radio access network.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIG. 5 is a flowchart of an example process 500 for network slice performance optimization. In some implementations, one or more process blocks of FIG. 5 may be performed by a RAN device (e.g., the RAN 110). In some implementations, one or more process blocks of FIG. 5 may be performed by another device or a group of devices separate from or including the RAN device, such as a PCF (e.g., the PCF 225), an AMF (e.g., the AMF 235), and/or an NWDAF (e.g., the NWDAF 250). Additionally, or alternatively, one or more process blocks of FIG. 5 may be performed by one or more components of the device 300, such as the processor 320, the memory 330, the input component 340, the output component 350, and/or the communication component 360.

As shown in FIG. 5, process 500 may include receiving a network slice identifier associated with a network slice target service level agreement not supported by the radio access network device for a user equipment associated with a network slice of a core network (block 510). For example, the radio access network device may receive a network slice identifier associated with a network slice target service level agreement not supported by the radio access network device for a user equipment associated with a network slice of a core network, as described above. In some implementations, the radio access network device is a femtocell base station that communicates with the core network via a service provider network. In some implementations, the radio access network device is one of a base transceiver station, a radio base station, a node B, an eNodeB, or a gNodeB.

In some implementations, receiving the network slice identifier associated with the network slice target service level agreement not supported by the radio access network device for the user equipment associated with the network slice includes receiving the network slice identifier associated with the network slice target service level agreement not supported by the radio access network device for the user equipment associated with the network slice based on a determination that a network slice performance service level agreement of the radio access network device fails to satisfy a threshold associated with the network slice target service level agreement.

As further shown in FIG. 5, process 500 may include receiving an indication of whether a neighbor radio access network supports the network slice target service level agreement (block 520). For example, the radio access network device may receive an indication of whether a neighbor radio access network supports the network slice target service level agreement, as described above.

As further shown in FIG. 5, process 500 may include requesting, from the user equipment, measurement information for the neighbor radio access network (block 530). For example, the radio access network device may request, from the user equipment, measurement information for the neighbor radio access network, as described above.

As further shown in FIG. 5, process 500 may include receiving, from the user equipment, the measurement information for the neighbor radio access network (block 540). For example, the radio access network device may receive, from the user equipment, the measurement information for the neighbor radio access network, as described above.

As further shown in FIG. 5, process 500 may include determining whether a handover criterion of the user equipment satisfies a threshold associated with the measurement information for the neighbor radio access network (block 550). For example, the radio access network device may determine whether a handover criterion of the user equipment satisfies a threshold associated with the measurement information for the neighbor radio access network, as described above.

As further shown in FIG. 5, process 500 may include redirecting the user equipment to the neighbor radio access network or moving the user equipment to another network slice based on whether the handover criterion of the user equipment satisfies a threshold associated with the measurement information for the neighbor radio access network (block 560). For example, the radio access network device may redirect the user equipment to the neighbor radio access network or move the user equipment to another network slice based on whether the handover criterion of the user equipment satisfies a threshold associated with the measurement information for the neighbor radio access network, as described above. In some implementations, redirecting the user equipment to the neighbor radio access network or moving the user equipment to another network slice includes redirecting the user equipment to the neighbor radio access network based on the handover criterion of the user equipment satisfying a threshold associated with the measurement information for the neighbor radio access network, or moving the user equipment to another network slice based on the handover criterion of the user equipment failing to satisfy a threshold associated with the measurement information for the neighbor radio access network.

In some implementations, process 500 includes causing one or more key performance indicators to be provided to a network data analytics function of the core network, wherein the one or more key performance indicators provide an indication of a network slice performance service level agreement of the radio access network device.

In some implementations, process 500 includes receiving another network slice identifier associated with another network slice target service level agreement supported by the radio access network device for the user equipment associated with another network slice, and maintaining connectivity of the user equipment with the other network slice based on receiving the other network slice identifier.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   receiving, by a network device of a core network from a network data analytics function of the core network, an indication that a radio access network fails to support a network slice target service level agreement for a user equipment associated with a network slice based on the network data analytics function determining that a network slice performance service level agreement of the radio access network fails to satisfy a threshold associated with the network slice target service level agreement;
   providing, by the network device and to the radio access network, a network slice identifier associated with the network slice target service level agreement not supported by the radio access network; and
   providing, by the network device and to the radio access network, an indication of whether a neighbor radio access network supports the network slice target service level agreement to cause the radio access network to redirect the user equipment to a neighbor radio access network or to move the user equipment to another network slice.

2. The method of claim 1,
   wherein the network device is an access and mobility management function of the core network.

3. The method of claim 1,
   wherein the radio access network is configured to redirect the user equipment to the neighbor radio access network based on a handover criterion of the user equipment satisfying a threshold associated with measurement information for the neighbor radio access network.

4. The method of claim 1,
   wherein the radio access network is configured to move the user equipment to another network slice based on a handover criterion of the user equipment failing to satisfy a threshold associated with measurement information for the neighbor radio access network.

5. The method of claim 1,
   wherein the indication of whether the neighbor radio access network supports the network slice target service level agreement causes the radio access network to request measurement information for the neighbor radio access network.

6. The method of claim 1,
   wherein the radio access network is a femtocell base station that communicates with the core network via a service provider network.

7. A radio access network device, comprising:
   one or more processors configured to:

provide, to a network data analytics function of a core network, one or more key performance indicators, wherein the one or more key performance indicators provide an indication of a network slice performance service level agreement of the radio access network device;
   receive a network slice identifier associated with a network slice target service level agreement not supported by the radio access network device for a user equipment associated with a network slice of the core network;
   receive an indication of whether a neighbor radio access network supports the network slice target service level agreement;
   request, from the user equipment, measurement information for the neighbor radio access network;
   receive, from the user equipment, the measurement information for the neighbor radio access network;
   determine whether a handover criterion of the user equipment satisfies a threshold associated with the measurement information for the neighbor radio access network and the one or more key performance indicators; and
   redirect the user equipment to the neighbor radio access network or move the user equipment to another network slice based on whether the handover criterion of the user equipment satisfies a threshold associated with the measurement information for the neighbor radio access network and the one or more key performance indicators.

8. The radio access network device of claim 7,
   wherein the radio access network device is a femtocell base station that communicates with the core network via a service provider network.

9. The radio access network device of claim 7,
   wherein the one or more processors, to redirect the user equipment to the neighbor radio access network or move the user equipment to another network slice, are configured to:
   redirect the user equipment to the neighbor radio access network based on the handover criterion of the user equipment satisfying a threshold associated with the measurement information for the neighbor radio access network; or
   move the user equipment to another network slice based on the handover criterion of the user equipment failing to satisfy a threshold associated with the measurement information for the neighbor radio access network.

10. The radio access network device of claim 7,
    wherein the one or more processors, to receive the network slice identifier associated with the network slice target service level agreement not supported by the radio access network device for the user equipment associated with the network slice, are configured to:
    receive the network slice identifier associated with the network slice target service level agreement not supported by the radio access network device for the user equipment associated with the network slice based on a determination that a network slice performance service level agreement of the radio access network device fails to satisfy a threshold associated with the network slice target service level agreement.

11. The radio access network device of claim 7,
    wherein the radio access network device is one of a base transceiver station, a radio base station, a node B, an eNodeB, or a gNodeB.

12. The radio access network device of claim 7,
wherein the one or more processors are further configured
to:
    receive another network slice identifier associated with
another network slice target service level agreement
supported by the radio access network device for the
user equipment associated with another network
slice; and
    maintain connectivity of the user equipment with the
other network slice based on receiving the other
network slice identifier.

13. A non-transitory computer-readable medium storing a
set of instructions, the set of instructions comprising:
    one or more instructions that, when executed by one or
more processors of a network device of a core network,
cause the network device to:
        receive an indication from a network data analytics
function of the core network that a radio access
network fails to support a network slice target ser-
vice level agreement for a user equipment associated
with a network slice based on the network data
analytics function determining that a network slice
performance service level agreement of the radio
access network fails to satisfy a threshold associated
with the network slice target service level agreement,
wherein the network device is an access and mobility
management function of the core network;
        provide, to the radio access network, a network slice
identifier associated with the network slice target
service level agreement not supported by the radio
access network; and
        provide, to the radio access network, an indication of
whether a neighbor radio access network supports
the network slice target service level agreement to
cause the radio access network to redirect the user
equipment to a neighbor radio access network or to
move the user equipment to another network slice.

14. The non-transitory computer-readable medium of
claim 13,
    wherein the one or more instructions further cause the
network device to redirect the user equipment to the
neighbor radio access network based on a handover
criterion of the user equipment satisfying a threshold associated with measurement information for the
neighbor radio access network.

15. The non-transitory computer-readable medium of
claim 13,
    wherein the one or more instructions further cause the
network device to move the user equipment to another
network slice based on a handover criterion of the user
equipment failing to satisfy a threshold associated with
measurement information for the neighbor radio access
network.

16. The non-transitory computer-readable medium of
claim 13,
    wherein the indication of whether the neighbor radio
access network supports the network slice target ser-
vice level agreement causes the radio access network to
request measurement information for the neighbor
radio access network.

17. The non-transitory computer-readable medium of
claim 13,
    wherein the radio access network is a femtocell base
station that communicates with the core network via a
service provider network.

18. The non-transitory computer-readable medium of
claim 13,
    wherein the network device is an access and mobility
management function of the core network.

19. The non-transitory computer-readable medium of
claim 13,
    wherein the radio access network is one of a base trans-
ceiver station, a radio base station, a node B, an
eNodeB, or a gNodeB.

20. The non-transitory computer-readable medium of
claim 13, wherein the one or more instructions, cause the
network device to:
    transmit another network slice identifier associated with
another network slice target service level agreement
supported by the radio access network for the user
equipment associated with another network slice,
wherein a connection of the user equipment with the
other network slice is based on transmitting the other
network slice identifier.

\*   \*   \*   \*   \*